US011301713B2

(12) United States Patent
Sombatsiri

(10) Patent No.: US 11,301,713 B2
(45) Date of Patent: Apr. 12, 2022

(54) INFORMATION PROCESSING APPARATUS, INFORMATION PROCESSING METHOD, AND NON-TRANSITORY COMPUTER READABLE MEDIUM

(71) Applicant: NEC Corporation, Tokyo (JP)

(72) Inventor: Salita Sombatsiri, Tokyo (JP)

(73) Assignee: NEC CORPORATION, Tokyo (JP)

( * ) Notice: Subject to any disclaimer, the term of this patent is extended or adjusted under 35 U.S.C. 154(b) by 181 days.

(21) Appl. No.: 16/758,196

(22) PCT Filed: Oct. 25, 2017

(86) PCT No.: PCT/JP2017/038428
§ 371 (c)(1),
(2) Date: Apr. 22, 2020

(87) PCT Pub. No.: WO2019/082290
PCT Pub. Date: May 2, 2019

(65) Prior Publication Data
US 2020/0302215 A1 Sep. 24, 2020

(51) Int. Cl.
*G06T 7/00* (2017.01)
*G06K 9/46* (2006.01)
(Continued)

(52) U.S. Cl.
CPC ......... *G06K 9/4628* (2013.01); *G06F 17/153* (2013.01); *G06K 9/6267* (2013.01); *G06N 3/04* (2013.01); *G06N 3/08* (2013.01)

(58) Field of Classification Search
CPC .......... G06T 1/20; G06T 19/00; G06T 15/00; G06T 5/00; G06T 1/60; G06T 11/00;
(Continued)

(56) References Cited

U.S. PATENT DOCUMENTS

| 2017/0085862 A1* | 3/2017 | McGarry | H04N 13/254 |
| 2018/0018556 A1* | 1/2018 | Young | G06N 3/063 |
| 2018/0053091 A1* | 2/2018 | Savvides | G06N 3/08 |

OTHER PUBLICATIONS

International Search Report for PCT Application No. PCT/JP2017/038428, dated Jan. 30, 2018.
(Continued)

*Primary Examiner* — Quan M Hua
(74) *Attorney, Agent, or Firm* — Sughrue Mion, PLLC

(57) ABSTRACT

An object is to provide an information processing apparatus capable of preventing utilization percentage of PEs from decreasing in a series of processes in CNN. An information processing apparatus (1) according to the present disclosure includes a PE (Processing Element) Grid (20) configured to perform a convolution by using a plurality of Kernels for Input matrix data and thereby generate a different Output matrix data for each of the used Kernels, the PE Grid (20) including a plurality of PEs configured to calculate pixels constituting the Output matrix data, and a Parallelism Controller (10) configured to determine, based on the Input matrix data or a dimension of the Output matrix data, and the number of the Kernels, whether pixels included in respective Output matrix data should be parallelly calculated or a plurality of pixels included in one Output matrix data should be parallelly calculated.

10 Claims, 14 Drawing Sheets

(51) Int. Cl.
*G06F 17/15* (2006.01)
*G06K 9/62* (2022.01)
*G06N 3/04* (2006.01)
*G06N 3/08* (2006.01)

(58) Field of Classification Search
CPC .. G06T 19/20; G06T 3/40; G06T 7/00; G06T 7/20; G06T 17/00; G06T 15/04; G06T 3/00; G06T 7/246; G06T 7/269; G06T 7/40; G06T 7/55; G06T 9/00; G06T 5/10; G06T 7/10; G06T 7/292; G06T 5/50; G06F 17/16; G06F 3/01; G06K 9/00; G06K 9/46; G06K 9/62; G06K 15/02; G06K 9/32; G06K 9/48; G06K 15/00; G09G 3/20; G09G 5/02; G09G 5/36; G09G 5/00; G09G 5/10
See application file for complete search history.

(56) References Cited

OTHER PUBLICATIONS

Written opinion for PCT Application No. PCT/JP2017/038428, dated Jan. 30, 2018.
Song Han, et. al., "EIE: Efficient Inference Engine on Compressed Deep Neural Network", International Symposium on Computer Architecture (ISCA), May 3, 2016, USA.
Sang-Soo Park et al., "Modified Convolution Neural Network for Highly Effective Parallel Processing", Proceedings of 2017 IEEE International Conference on Information Reuse and Integration, IEEE, Aug. 4, 2017, Korea.

* cited by examiner

| #1 | #2 | #3 |
|----|----|----|
| #4 | #5 | #6 |
| #7 | #8 | #9 |

FIG. 4

Sparse index
(Kernel#elementID)
(#diffKbc= 1)

| 1#1 | 1#3 | 1#5 | 1#6 |
|-----|-----|-----|-----|
| 1#7 | 2#1 | 2#2 | 2#3 |
| 2#4 | 2#5 | 2#7 | 2#8 |
| 2#9 | 3#2 | 3#8 | 4#1 |
| 4#2 | 4#3 | 4#5 | 4#7 |
| 4#9 |     |     |     |

Kernel #1: Assuming k12, k14, k18, and k19 are 0

Kernel #2: Assuming k26 is 0

Compressed Sparse Weights
(#diffKbc= 1)

| k11 | k13 | k15 | k16 |
|-----|-----|-----|-----|
| k17 | k21 | k22 | k23 |
| k24 | k25 | k27 | k28 |
| k29 | k32 | k38 | k41 |
| k42 | k43 | k45 | k47 |
| k49 |     |     |     |

Kernel #3: Assuming k31, k33, k34 to k37, and k39 are 0

Kernel #4: Assuming k44, k46, and k48 are 0

INFORMATION PROCESSING APPARATUS, INFORMATION PROCESSING METHOD, AND NON-TRANSITORY COMPUTER READABLE MEDIUM

TECHNICAL FIELD

The present disclosure relates to an information processing apparatus, an information processing method, and a program.

BACKGROUND ART

In recent years, application of CNN (Convolutional Neural Networks) has been studied in the field of image recognition and the like. The CNN includes a Convolutional Layer, a Subsampling Layer (a Pooling Layer), and a Fully connected Layer. In the Convolutional Layer, a convolution is performed by using a plurality of Kernels or Filters and thereby a plurality of Feature Maps are generated. Further, in the Sub sampling Layer, the data size of the Feature Maps is compressed. After the processes in the Convolutional Layer and the Subsampling Layer are repeated, all the data are connected and data that is used in image recognition or the like is generated.

The amount of computation in the Convolutional Layer is enormous. Therefore, a configuration for parallelly performing computations in the Convolutional Layer in an information processing apparatus has been studied. For example, Non-patent Literature 1 discloses a configuration in which a Kernel or a Weight value used in each of PEs (Processing Elements) that perform parallel processing is defined in advance and the same data is input to each of the PEs. A Kernel defined in each PE differs from Kernels defined in the other PEs. In this way, computations in the Convolutional Layer are parallelly performed by the plurality of PEs.

CITATION LIST

Non Patent Literature

NPL 1: EIE: Efficient Inference Engine on Compressed Deep Neural Network, May 3, 2016

SUMMARY OF INVENTION

Technical Problem

In the CNN, as the processes in the Convolutional Layer and the Subsampling Layer are repeated, the Data size of Feature Maps becomes smaller and the number of Feature Maps increases. In other words, in the CNN, at first, Feature Maps are generated by applying a small number of Kernels to Input matrix data having a large Data size. After that, a large number of Kernels are applied to Feature Maps whose Data size has been reduced by the compression performed in the Subsampling Layer. One Feature Map is generated for each of the applied Kernels. It should be noted that in the case where Kernels that are used for respective PEs are defined in advance, when the number of used Kernels is small in the process performed in the Convolutional Layer, the number of used PEs decreases. As a result, there is a problem that the utilization percentage of the PEs decreases.

An object of the present disclosure is to provide an information processing apparatus, an information processing method, and a program capable of preventing utilization percentage of PEs from decreasing in a series of processes in the CNN.

Solution to Problem

In a first example aspect, an information processing apparatus includes: a PE (Processing Element) Grid configured to perform a convolution by using a plurality of Kernels for Input matrix data and thereby generate a different Output matrix data for each of the used Kernels, the PE Grid including a plurality of PEs configured to calculate pixels constituting the Output matrix data; and a Parallelism Controller configured to determine, based on the Input matrix data or a dimension of the Output matrix data, and the number of the Kernels, whether pixels included in respective Output matrix data should be parallelly calculated or a plurality of pixels included in one Output matrix data should be parallelly calculated.

In a second example aspect, an information processing method includes: performing a convolution by using a plurality of Kernels for Input matrix data and thereby acquiring a dimension of Output matrix data generated for each of the used Kernels or a dimension of the Input matrix data, and the number of the Kernels; determining, based on the dimension of the Output matrix data or the dimension of the Input matrix data, and the number of the Kernels, whether pixels included in respective Output matrix data should be parallelly calculated or the plurality of pixels included in one Output matrix data should be parallelly calculated; and generating the Output matrix data based on the calculation method.

In a third example aspect, a program causes a computer to: perform a convolution by using a plurality of Kernels for Input matrix data and thereby acquire a dimension of Output matrix data generated for each of the used Kernels or a dimension of the Input matrix data, and the number of the Kernels; determine, based on the dimension of the Output matrix data or the dimension of the Input matrix data, and the number of the Kernels, whether pixels included in respective Output matrix data should be parallelly calculated or the plurality of pixels included in one Output matrix data should be parallelly calculated; and generate the Output matrix data based on the calculation method.

Advantageous Effects of Invention

According to the present disclosure, it is possible to provide an information processing apparatus, an information processing method, and a program capable of preventing utilization percentage of PEs from decreasing in a series of processes in the CNN.

BRIEF DESCRIPTION OF DRAWINGS

FIG. 4 is a table for explaining Indexes in Kernels according to the second embodiment;

FIG. 5 is a diagram for explaining Sparse Indexes and Compressed Sparse Weights according to the second embodiment;

FIG. 6 is a diagram for explaining Sparse Indexes and Compressed Sparse Weights according to the second embodiment;

DESCRIPTION OF EMBODIMENTS (Outline of Convolutional Layer Processing)

Figure 11:
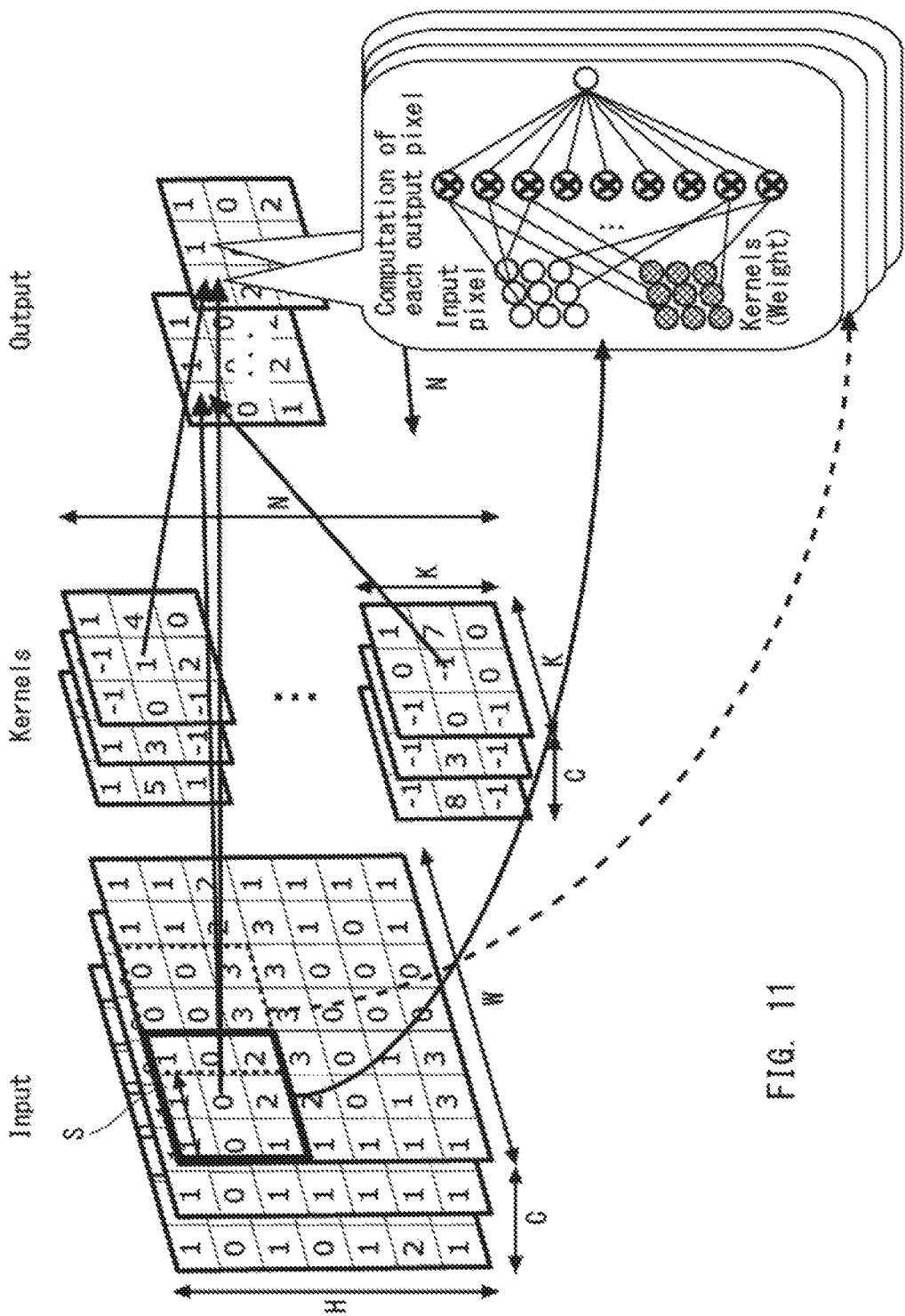
FIG. 11 is a diagram for explaining an outline of computations in a Convolutional Layer.

Prior to explaining embodiments according to this present disclosure, an outline of computations in the Convolutional Layer is explained with reference to FIG. 11. FIG. 11 shows an outline of a convolution performed by using Kernels having 3×3 dimensions. In this example, the explanation is given by using Input feature maps as Input matrix data. For the Input feature maps, dimensions that are specified by a Height of the input feature maps (H) and a Width of the input feature maps (W) are defined. Further, a symbol C used in the Input feature maps shown in FIG. 11 indicates the number of channels of input feature maps.

For the Kernel, a dimension that is specified by a Kernel size (K) is defined. Further, a symbol C used in the Kernel shown in FIG. 11 indicates the number of channels of Kernels. A symbol N indicates the Number of Kernels.

A symbol S indicates a Stride size, i.e., an interval at which a Kernel slides in the Input feature maps in a convolution.

Elements that constitute Input matrix data and Output matrix data may also be referred to as pixels. Further, elements that constitute a Kernel may also be referred to as Weight values or Weights.

A value of one pixel in Output matrix data is calculated by performing a multiply-accumulate operation by using Weights of the Kernel and pixels of the Input feature maps to which the Kernel is applied. FIG. 11 shows that 3×3 Output matrix data is calculated by performing a multiply-accumulate operation of 7×7 Input feature maps and 3×3 Kernels while sliding the Kernel with a Stride of two (Stride=2). These numbers are an example. Further, Output matrix data is generated for each of the used Kernels. In FIG. 11, since the number of Kernels is N, the number of generated Output matrix data is also N.

Figure 12:
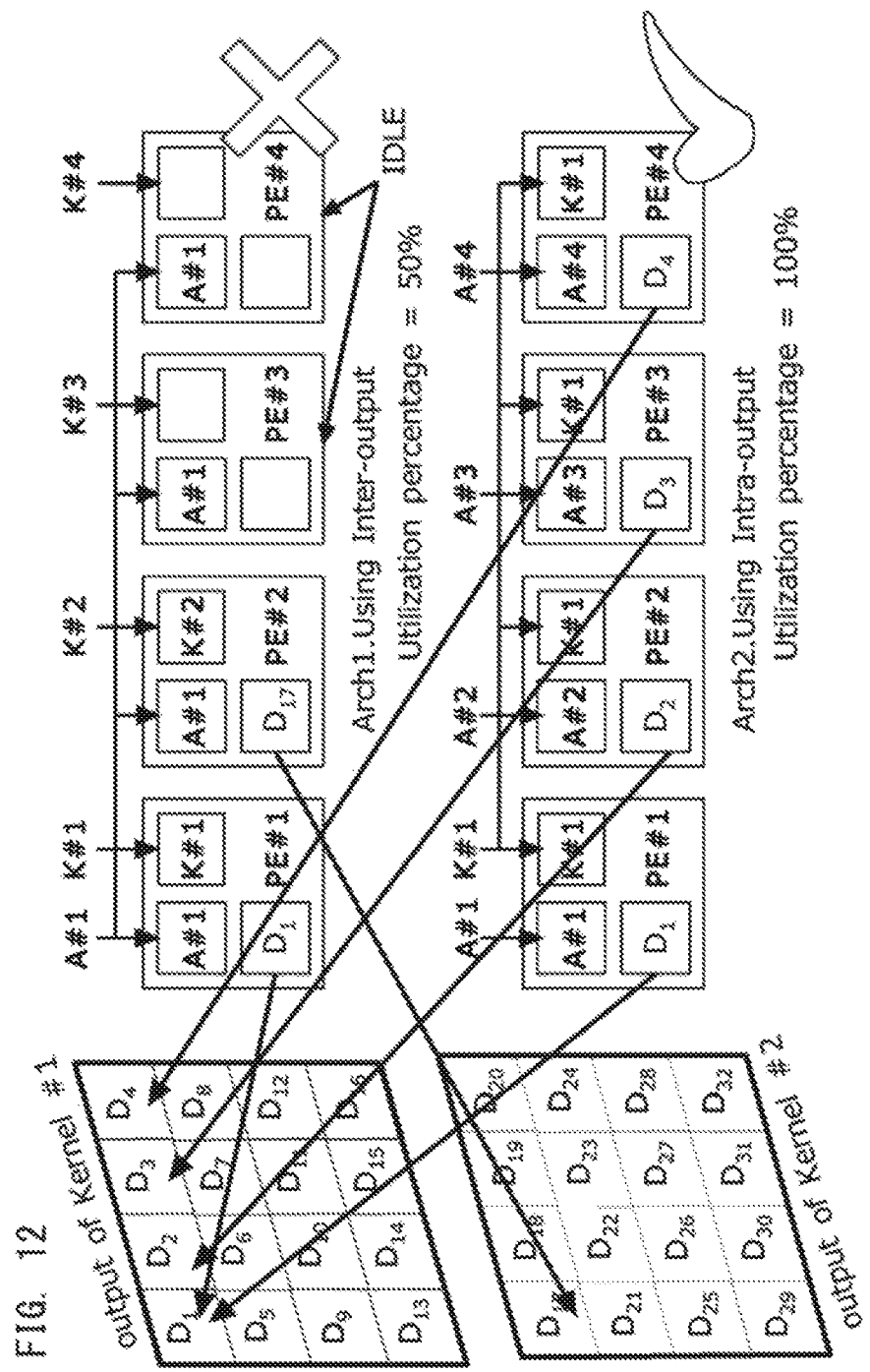
FIG. 12 is a diagram for explaining a problem to be solved by the present disclosure in detail.

Next, a problem to be solved by the present disclosure is explained in detail with reference to FIGS. 12 and 13. FIG. 12 shows a computation performed in a Convolutional layer that computes large output and uses small number of kernels, for example, in a computation performed in a shallow layer. FIG. 12 shows that two Output matrix data (outputs of Kernels 1 and 2) can be generated by using Kernels #1 and #2. The Output matrix data (the output of Kernel 1) generated by using Kernel #1 includes pixels D1 to D16. Further, the Output matrix data (the output of Kernel 2) generated by using Kernel #2 includes pixels D17 to D32. Further, FIG. 12 shows that parallel computations are performed by using PEs (Processing Elements) #1 to #4.

Arch 1 indicates an Inter-output parallelism scheme. The Inter-output parallelism scheme is a scheme in which pixels included in respective Output matrix data are parallelly calculated. In FIG. 12, the PE #1 calculates the pixel D1 by performing a multiply-accumulate operation of Kernel #1 and A #1 in the Input feature maps. Kernel #1 may include a plurality of elements or a single element. A #1 may include a plurality of elements or a single element. A #1 includes the N×M (N and M are integers no less than one) size of window of the Input feature maps that is used to compute D1. Further, the PE #2 calculates the pixel D17 by performing a multiply-accumulate operation of Kernel #2 and A #1. That is, the Arch 1 indicates that the PE #1 calculates the pixels D1 to D16 by using Kernel #1 and the PE #2 calculates the pixels D17 to D32 by using Kernel #2.

In the Arch 1, since the number of used Kernels is two, the PEs #3 and #4 are not used. That is, since the number of used Kernels is smaller than the number of PEs, there are PEs that are not used. The utilization percentage is only 50% in this example.

Arch 2 indicates an Intra-output parallelism scheme. The Intra-output parallelism scheme is a scheme in which a plurality of pixels included in one Output matrix data are parallelly calculated. In FIG. 12, the PE #1 calculates the pixel D1 by performing a multiply-accumulate operation of Kernel #1 and A #1 in the Input feature maps. Further, the PE #2 calculates the pixel D2 by performing a multiply-accumulate operation of Kernel #1 and A #2 which is data slid from A #1 by a predetermined Stride. Further, the PE #3 calculates the pixel D3 by performing a multiply-accumulate operation of Kernel #1 and A #3 which is data slid from A #2 by the predetermined Stride, and the PE #4 calculates the pixel D4 by performing a multiply-accumulate operation of Kernel #1 and A #4 which is data slid from A #3 by the predetermined Stride.

In the Arch 2, the number of pixels included in one Output matrix data is larger than the number of PEs. Therefore, a plurality of pixels included in the Output matrix data can be computed by using all the PEs. The utilization percentage is 100% in this example.

Figure 13:
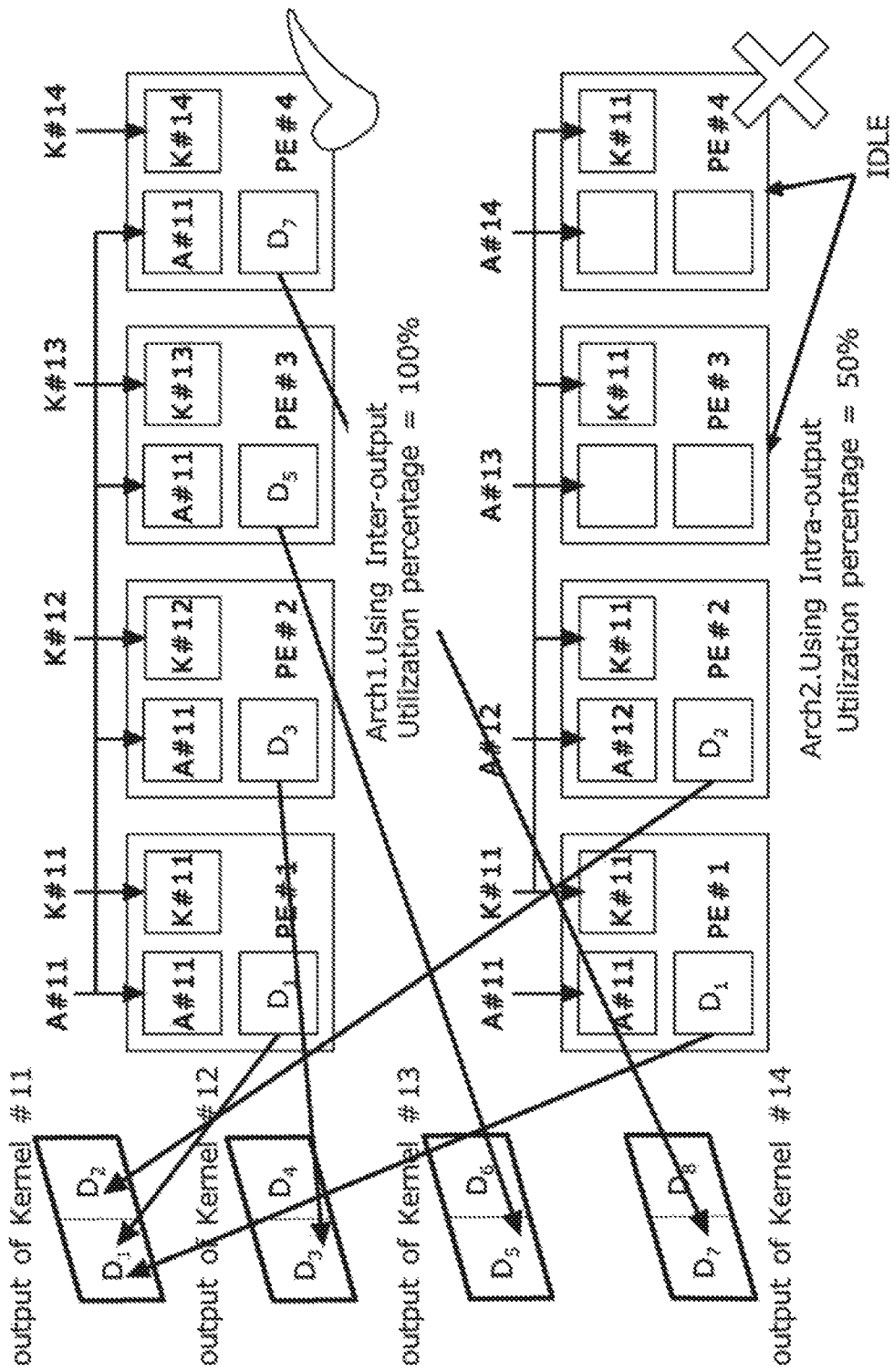
FIG. 13 is a diagram for explaining a problem to be solved by the present disclosure in detail.

Meanwhile, FIG. 13 shows an operation performed in a Convolutional layer that computes small output and uses large number of kernels, for example, in a computation performed in a deep layer. FIG. 13 shows that four Output matrix data (Output of Kernel 11, Output of Kernel 12, Output of Kernel 13, and Output of Kernel 14) are generated by using Kernels #11 to #14. The Output matrix data (Output of Kernel 11) generated by using Kernel #11 includes pixels D1 and D2, and the Output matrix data (Output of Kernel 12) generated by using Kernel #2 includes pixels D3 and D4. Further, the Output matrix data (Output of Kernel 13) generated by using Kernel #13 includes pixels D5 and D6, and the Output matrix data (Output of Kernel 14) generated by using Kernel #14 includes pixels D7 and D8. Further, similarly to FIG. 12, FIG. 13 shows that parallel computations are performed by using PEs (Processing Elements) #1 to #4.

Arch 1 indicates an Inter-output parallelism scheme. In FIG. 13, the PE #1 calculates the pixel D1 by performing a multiply-accumulate operation of Kernel #11 and A #11 in Input feature maps, and the PE #2 calculates the pixel D3 by performing a multiply-accumulate operation of Kernel #12 and A #11. Further, the PE #3 calculates the pixel D5 by performing a multiply-accumulate operation of Kernel #13 and A #11 in Input feature maps, and the PE #4 calculates the pixel D7 by performing a multiply-accumulate operation of Kernel #14 and A #11.

In the Arch 1, since the number of used Kernels is four, pixels included in four Output matrix data can be computed by using the PEs #1 to #4. That is, when the number of used Kernels is larger than or equal to the number of PEs, all the PEs are used. The utilization percentage is 100% in this example.

Arch 2 indicates an Intra-output parallelism scheme. In FIG. 13, the PE #1 calculates the pixel D1 by performing a multiply-accumulate operation of Kernel #11 and A #11 in Input feature maps. Further, the PE #2 calculates the pixel D2 by performing a multiply-accumulate operation of Kernel #11 and A #12 which is data slid from A #11 by a predetermined Stride.

In the Arch 2, since the number of pixels of Output matrix data that is generated by using Kernel #11 is two, the PEs #3 and #4 are not used. That is, the number of pixels included in one Output matrix data is smaller than the number of PEs. Therefore, there are PEs that are not used. The utilization percentage is 50% in this example.

In Non-patent Literature 1, the configuration of the Arch 1 shown in FIGS. 12 and 13 is disclosed. Therefore, when the configuration shown in Non-patent Literature 1 is used, it causes a problem that utilization percentage of PEs decreases in the case of FIG. 12 in which the number of pixels of Output matrix data is large and the number of used Kernels is small.

Further, when the configuration of the Arch 2 shown FIGS. 12 and 13 is used, it causes a problem that utilization percentage of PEs decreases in the case of FIG. 13 in which the number of pixels of Output matrix data is small and the number of used Kernels is large.

Each of embodiments described below is implemented to solve the above-described problem.

First Embodiment

Figure 1:
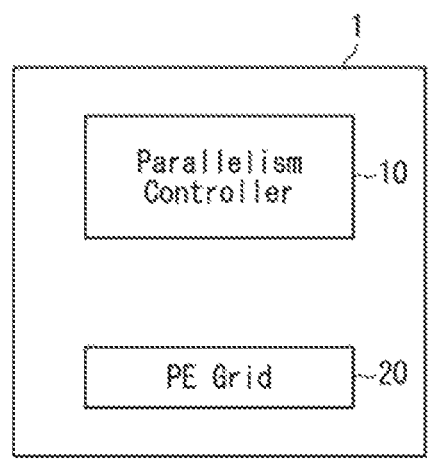
FIG. 1 a configuration diagram of an information processing apparatus according to a first embodiment.

Firstly, an information processing apparatus 1 according to a first embodiment is explained with reference to FIG. 1. The information processing apparatus 1 may be a computer apparatus in which a processor executes a program stored in a memory, so that processes are performed. The information processing apparatus 1 includes a Parallelism Controller 10 and a PE Grid 20. The Parallelism Controller 10 and the PE Grid 20 may be software or modules that are executed by having the processor execute a program stored in the memory. Alternatively, the Parallelism Controller 10 and the PE Grid 20 may be hardware such as a circuit or a chip.

The PE Grid 20 performs a convolution by using a plurality of Kernels for Input matrix data and thereby generates a different Output matrix data for each of the used Kernels. Further, the PE Grid 20 includes a plurality of PEs that calculate pixels constituting Output matrix data. Note that the Kernels that are used by respective PEs included in the PE Grid 20 may be varied from one another, i.e., varied for each PE.

The Parallelism Controller 10 determines, based on the dimension of Input matrix data or the dimension of Output matrix data, the number of Kernels and the number of PEs, whether pixels included in respective Output matrix data should be parallelly calculated or a plurality of pixels included in one Output matrix data should be parallelly calculated. The dimension of Input matrix data or the dimension of the Output matrix data may be expressed in the form of N×M (N and M are integers no less than one) to indicate the number of pixels of the Input matrix data or the Output matrix data. In other words, the Parallelism Controller 10 determines which of the Inter-output parallelism scheme and the Intra-output parallelism scheme should be performed.

Figure 2:
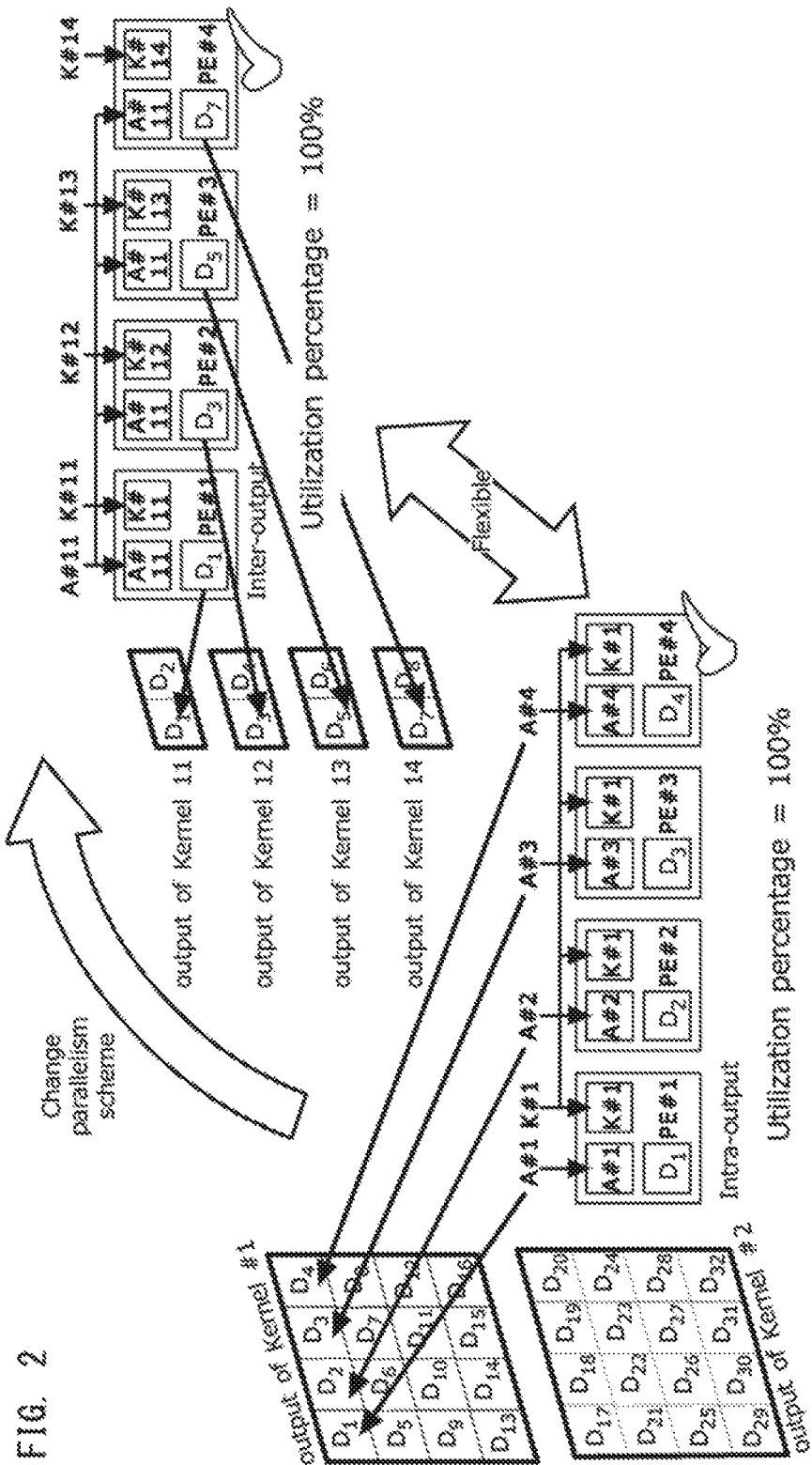
FIG. 2 is a diagram for explaining an outline of processes carried out by an information processing apparatus according to a second embodiment.

An outline of processes carried out by the information processing apparatus 1 is explained hereinafter with reference to FIG. 2. The information processing apparatus 1 flexibly selects the Inter-output parallelism scheme or the Intra-output parallelism scheme. In this way, as shown in FIG. 2, for example, when the number of pixels included in one Output matrix data is larger than the number of PEs and the number of used Kernels is smaller than the number of PEs, the Parallelism Controller 10 may select the Intra-output parallelism scheme. Further, when the number of pixels included in one Output matrix data is smaller than the number of PEs and the number of used Kernels is equal to or larger than the number of PEs, the Parallelism Controller 10 may select the Inter-output parallelism scheme. As a result, the utilization percentage of the PEs can be improved. The utilization percentage is 100% in this example.

Further, according to the above explanation, the Parallelism Controller 10 flexibly selects the Inter-output parallelism scheme or the Intra-output parallelism scheme by using the dimension of the Output matrix data. However, the Parallelism Controller 10 may select the Inter-output parallelism scheme or the Intra-output parallelism scheme by using the dimension of the Input matrix data.

For example, when the number of pixels included in Input matrix data is large and the number of used Kernels is small, the Parallelism Controller 10 may select the Intra-output parallelism scheme. Further, when the number of pixels included in Input matrix data is small and the number of used Kernels is large, the Parallelism Controller 10 may select the Inter-output parallelism scheme.

Further, regarding the expression that "the number is large or small" in the above explanation and in the following explanation, when a number is larger than a predetermined threshold, it may mean that the number is large, whereas when a number is smaller than the predetermined threshold, it may mean that the number is small.

Second Embodiment

Figure 3:
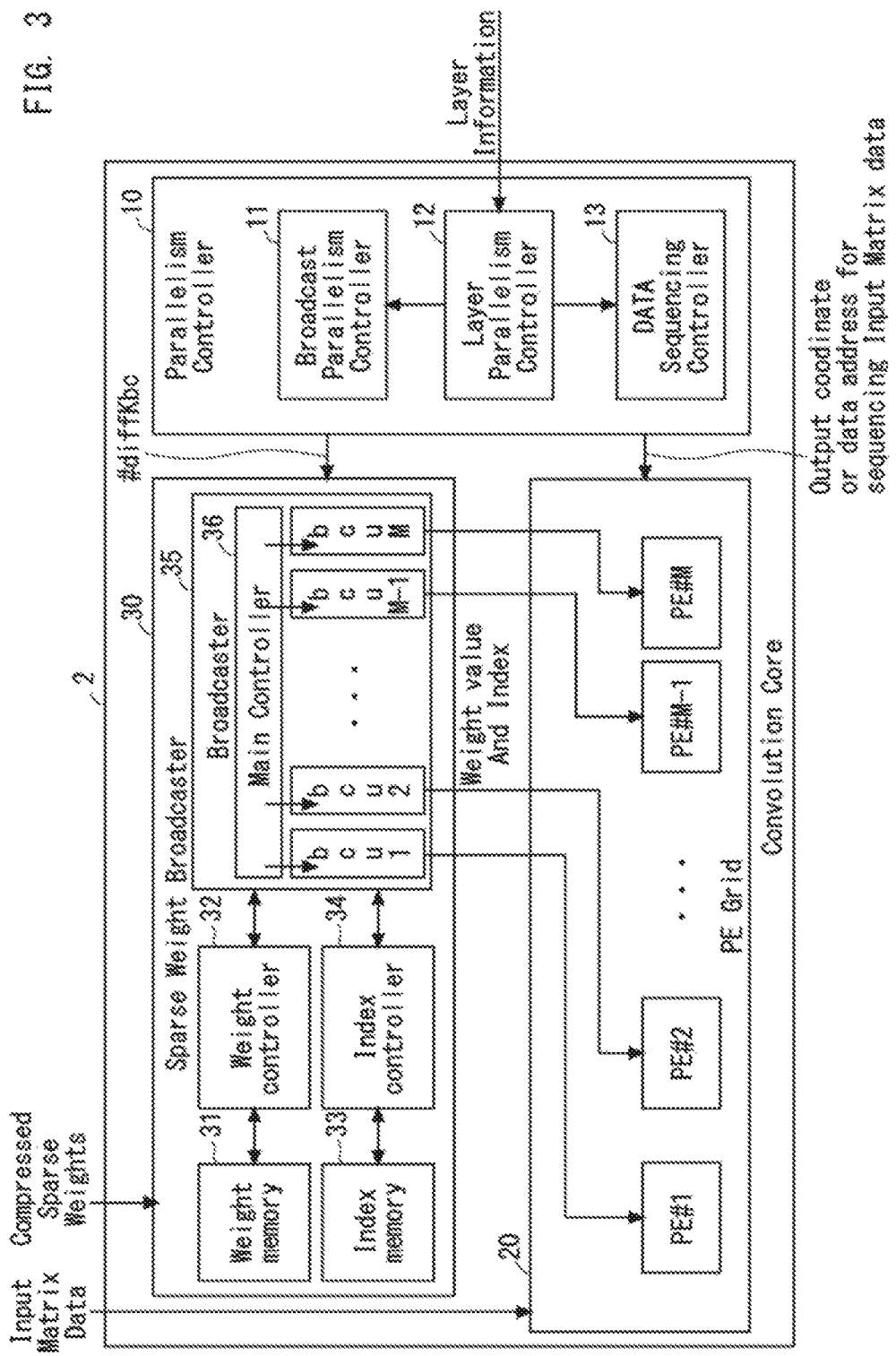
FIG. 3 is a configuration diagram of the information processing apparatus according to the second embodiment.

Next, a configuration example of an information processing apparatus 2 according to a second embodiment is explained with reference to FIG. 3. Compared to the information processing apparatus 1 shown in FIG. 1, the information processing apparatus 2 additionally includes a Sparse Weight Broadcaster 30. The Sparse Weight Broadcaster 30 may be software or a module that is executed by having a processor execute a program stored in a memory. Alternatively, the Sparse Weight Broadcaster 30 may be hardware such as a circuit or a chip.

The Sparse Weight Broadcaster 30 determines Kernels that are applied to a plurality of PEs included in the PE Grid 20. In other words, the Sparse Weight Broadcaster 30 determines Weight values used by the plurality of PEs included in the PE Grid 20.

Next, a configuration example of the Parallelism Controller 10 is explained. The Parallelism Controller 10 includes a Broadcast Parallelism Controller 11, a Layer Parallelism Controller 12, and a Data Sequencing Controller 13.

The Layer Parallelism Controller 12 receives Layer information from other functional blocks or components in the information processing apparatus 2. The Layer information includes information about the dimension of Output matrix data, the number of used Kernels, the number of PEs and the like in a layer in which the process is performed.

The Layer Parallelism Controller 12 determines which of the Inter-output parallelism scheme and the Intra-output parallelism scheme should be performed based on the Layer information. The Inter-output parallelism scheme or the Intra-output parallelism may be determined in advance.

For example, the Layer Parallelism Controller 12 may select the Intra-output parallelism scheme when the number of pixels specified by the dimension of Output matrix data is larger than the number of PEs included in the PE Grid 20, and select the Inter-output parallelism scheme when the number of pixels is not larger than the number of PEs included in the PE Grid 20. Alternatively, the Layer Parallelism Controller 12 may select the Inter-output parallelism scheme when the number of used Kernels is larger than the number of PEs included in the PE Grid 20, and select the Intra-output parallelism scheme when the number of used Kernels is not larger than the number of PEs included in the PE Grid 20.

Alternatively, the Layer Parallelism Controller 12 may select the Intra-output parallelism scheme when the number of pixels is larger than the number of PEs included in the PE Grid 20 and the number of used Kernels is not larger than the number of PEs included in the PE Grid 20. Further, the Layer Parallelism Controller 12 may select the Inter-output parallelism scheme when the number of pixels is not larger than the number of PEs included in the PE Grid 20 and the number of used Kernels is larger than the number of PEs included in the PE Grid 20.

It may be determined in advance which of the parallelism schemes should be selected when the number of pixels is larger than the number of PEs included in the PE Grid 20 and the number of used Kernels is larger than the number of PEs included in the PE Grid 20, and which of the parallelism schemes should be selected when the number of pixels is not larger than the number of PEs included in the PE Grid 20 and the number of used Kernels is not lager than the number of PEs included in the PE Grid 20.

The Layer Parallelism Controller 12 outputs the selected parallelism scheme to the Broadcast Parallelism Controller 11 and the Data Sequencing Controller 13.

The Broadcast Parallelism Controller 11 determines the number of different Kernels to be broadcasted at the same time (hereinafter represented by #diffKbc). The term #diffKbc may also be expressed as the number of Kernels to be used at the same time in a plurality of PEs that parallelly perform computations in the PE Grid 20. The term "same time" includes substantially the same timing. In other words, the same time includes a case in which a time difference between different timings is equal to or shorter than a predetermined time period.

For example, the Broadcast Parallelism Controller 11 may determine that #diffKbc is one when the Intra-output parallelism scheme is selected. Further, the Broadcast Parallelism Controller 11 may determine that #diffKbc is any number no less than two when the Inter-output parallelism scheme is selected. Further, in the case where the Inter-output parallelism scheme is selected, the Broadcast Parallelism Controller 11 may set #diffKbc to the number of PEs when the number of Kernels is larger than the number of PEs, and set #diffKbc to the number of Kernels when the number of Kernels is not larger than the number of PEs. The Broadcast Parallelism Controller 11 outputs the determined #diffKbc to the Sparse Weight Broadcaster 30.

The Data Sequencing Controller 13 determines coordinates of pixels of Input matrix data used by a respective one of the PEs or coordinates of pixels of Output matrix data to be computed by a respective one of the PEs. The coordinates of pixels of Input matrix data and Output matrix data may be related.

For example, the Data Sequencing Controller 13 may determine that data at the same pixel coordinate in Input matrix data is used in all the PEs included in the PE Grid 20 when the Inter-output parallelism scheme is selected. Further, the Data Sequencing Controller 13 may determine the coordinate of the pixels of Input matrix data to be used for each of the PEs when the Intra-output parallelism scheme is selected. For example, the Data Sequencing Controller 13 may determine the coordinate of the pixels of Input matrix data to be used for each of the PEs based on a predetermined Stride. The Data Sequencing Controller 13 outputs information indicating the coordinates of pixels of the Input matrix data used by respective PEs and information indicating the coordinates of pixels of Output matrix data calculated by respective PEs to the PE Grid 20. The coordinates of pixels of the Input matrix data and the Output matrix data may also be referred to as data addresses.

Next, a configuration of the Sparse Weight Broadcaster 30 is explained. The Sparse Weight Broadcaster 30 includes a Weight memory 31, a Weight Controller 32, an Index memory 33, an Index Controller 34, a Broadcaster 35, a Main Controller 36, and bcus (broadcast units) #1 to #M. The sign "M" in bcu #M is not related to the M in N×M that is used to express the dimension of Input matrix data or the dimension of the Output matrix data.

Figure 4:
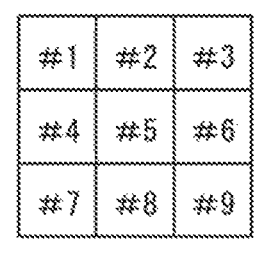

The Index memory 33 manages (i.e., stores) Sparse Indexes. The Sparse Index indicates an Index in which a Non zero value is set as a Weight value of a Kernel. For example, assume that #1 to #9 are defined as Indexes of Kernel #1 as shown in FIG. 4. In this case, each Index of Kernel #1 is expressed as one of 1#1 to 1#9. Further, the Index memory 33 manages, among the indexes 1#1 to 1#9, Sparse Indexes in which Non zero values are set. Further, the Weight memory 31 manages Compressed Sparse Weights as Non zero values set in the Sparse Indexes.

A relation between Sparse Indexes and Compressed Sparse Weights is explained hereinafter with reference to FIG. 5. FIG. 5 shows Weight values set in Kernels #1 to #4. For example, in Kernel #1, zero values are set in 1#2, 1#4, 1#8, and 1#9. Therefore, 1#1, 1#3, 1#5, 1#6, and 1#7 are managed in Sparse Indexes. Further, values $k_{11}$, $k_{13}$, $k_{15}$, $k_{16}$, and $k_{17}$ are managed in Compressed Sparse Weights as values set in 1#1, 1#3, 1#5, 1#6, and 1#7. Similarly to Kernel #1, Sparse Indexes and Compressed Sparse Weights are managed for each of Kernels #2 to #4.

Referring to FIG. 3 again, the Index Controller 34 reads values of Sparse Indexes from the Index memory 33 and outputs the read information to the Broadcaster 35. The Index Controller 34 successively reads Sparse Indexes from the left to the right in the first row. Then, when the reading in the first row is finished, the Index Controller 34 reads Sparse Indexes from the left to the right in the second row. Further, the Weight Controller 32 reads Compressed Sparse Weights from the Weight memory 31 and outputs the read information to the Broadcaster 35. The Weight Controller 32 successively reads Compressed Sparse Weights from the left to the right in the first row. Then, when the reading in the first row is finished, the Weight Controller 32 reads Compressed Sparse Weights from the left to the right in the second row.

The Main Controller 36 outputs the Weight values output from the Weight Controller 32 and the Indexes output from the Index Controller 34 to the bcus #1 to #M. It is assumed that the bcus #1 to #M correspond to the PEs #1 to #M, respectively, included in the PE Grid 20. That is, the Weight value and the Index output from the bcu #1 is input to the PE #1.

Here, when the number #diffKbc is one (#diffKbc=1), the Main Controller 36 outputs information read from Sparse Indexes and Compressed Sparse Weights shown in FIG. 5 to the PEs #1 to #M through the bcus #1 to #M. Each of the PEs #1 to #M revives the same Weight value and the same Index.

Figure 6:
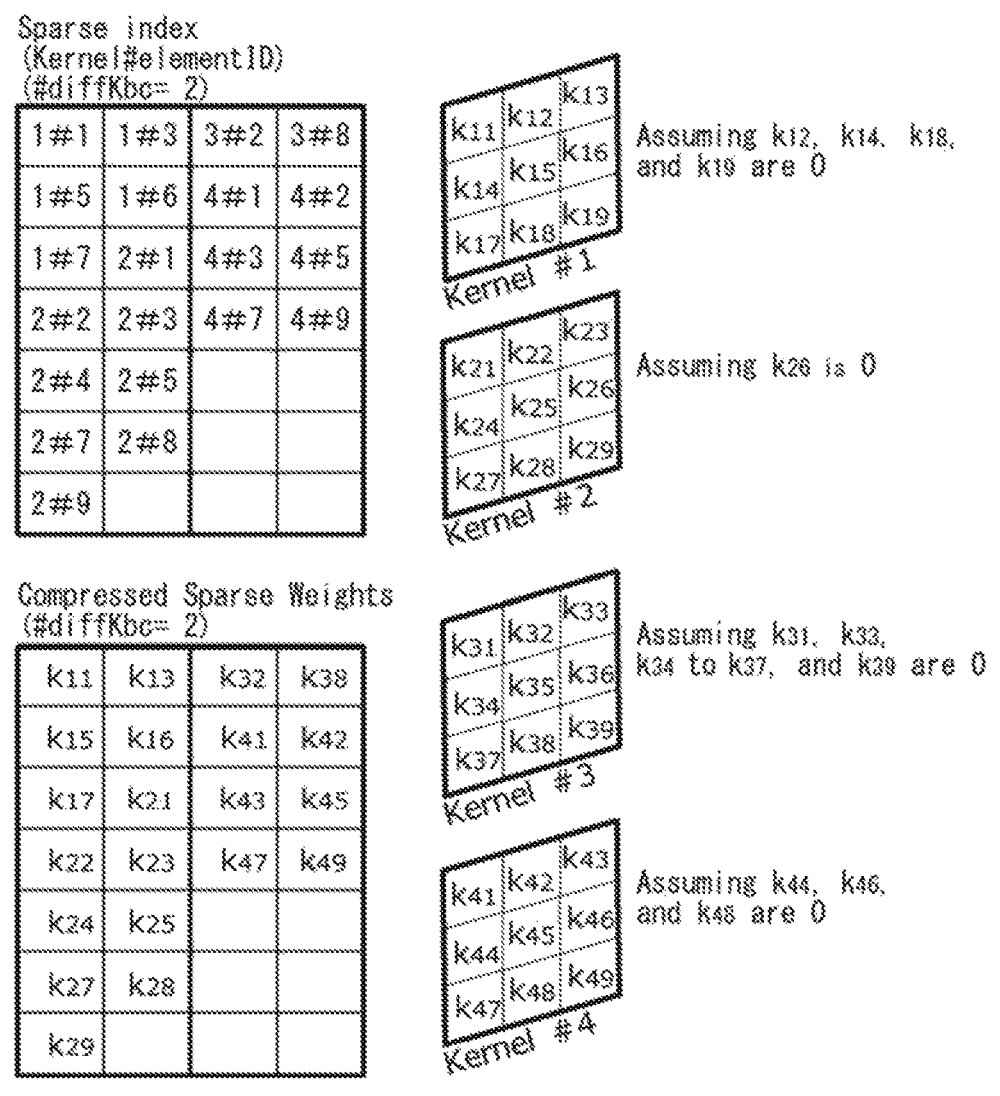

Further, an example in which #diffKbc is two (#diffKbc=2) is explained with reference to FIG. 6. In this case, assume that, for example, the PEs #1 and #2 included in the PE Grid 20 are used for computations. In this case, as shown in FIG. 6, after the Index Controller 34 reads Sparse Indexes up to the second column in the first row, it starts to read Sparse Indexes in the second row. Further, the Index Controller 34 starts to read Sparse Indexes from the third column in the first row. Then, after reading Sparse Indexes up to the fourth column in the first row, the Index Controller 34 starts to read Sparse Indexes from the third column in the second row. The Index Controller 34 reads Kernel #1 and Kernel #3 at the same time. Instead, the Index Controller 34 reads in turns the first row of Kernel #1, the first row of Kernel #3, the second row of Kernel #1, the second row of Kernel #3, and so on. The Weight Controller 32 performs reading in a similar manner.

The Main Controller 36 outputs the Weight values and the Indexes read from the first and second columns of the Sparse Indexes and the Compressed Sparse Weights to the PE #1 through the bcu #1. Further, the Main Controller 36 outputs the Weight values and the Indexes read from the third and fourth columns to the PE #2 through the bcu #2. FIG. 6 shows that, for example, processes using Kernels #1 and #2 are performed in the PE #1, and processes using Kernels #3 and #4 are performed in the PE #2.

Next, a configuration example of the PE Grid 20 is explained. The PE Grid 20 includes the PEs #1 to #M. Further, the PE Grid 20 receives Input matrix data from other functional blocks or components in the information processing apparatus 2. The Input matrix data may also be referred to as Activation data.

The Input matrix data indicates values that are set in pixels a1 to ai (i is an integer no less than two) or the like. The PEs #1 to #M extract Data from the Input matrix data based on coordinates of pixels in the Input matrix data output from the Data Sequencing Controller 13. Further, the PEs #1 to #M perform a convolution by using the extracted Data, and Weight values and Indexes output from the bcus #1 to #M. The PEs #1 to #M hold calculation results as values at coordinates of pixels of Output matrix data output from the Data Sequencing Controller 13.

Further, although a configuration in which the PE Grid 20 includes a plurality of PEs has been explained above with reference to FIG. 3, the PE Grid 20 may be configured so that it includes a plurality of PEGs (PE Groups) and each PEG includes a plurality of PEs. In such a case, the bcus in the Broadcaster 35 may be associated with the PEGs in a one-to-one manner. A plurality of PEs within the PEG are recognized that they perform the Intra-output parallelism scheme. Further, a plurality of PEGs that use Kernels different from each other are recognized that they perform the Inter-output parallelism scheme.

Figure 7:
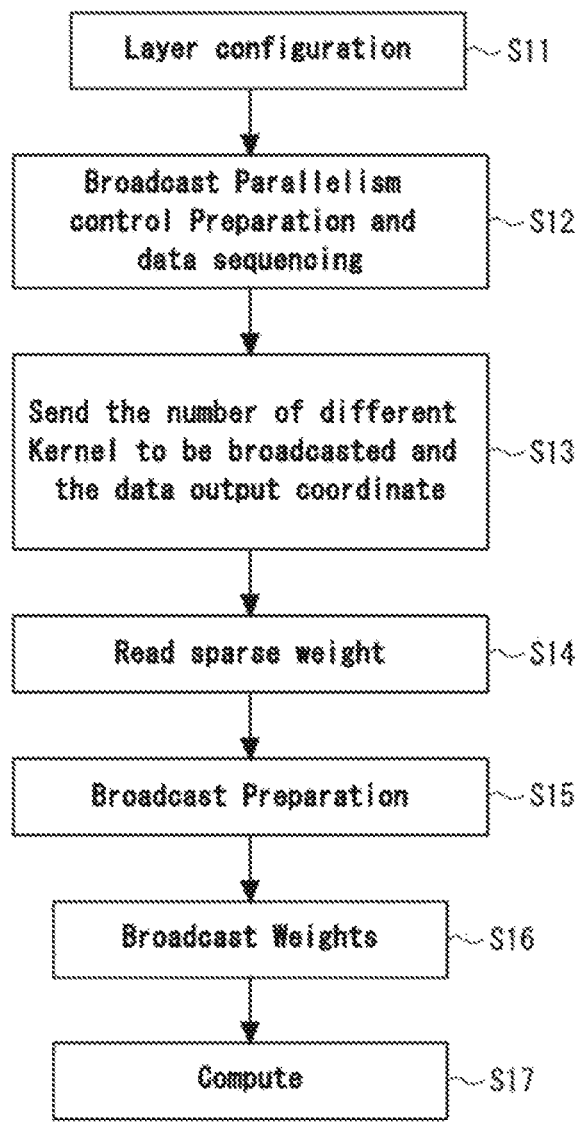
FIG. 7 is a flowchart showing a flow of a convolution according to the second embodiment.

Next, a flow of a convolution process according to the second embodiment is explained with reference to FIG. 7.

Firstly, the Layer Parallelism Controller 12 acquires Layer information (S11). The Layer information may also be referred to as a Layer configuration. Next, the Layer Parallelism Controller 12 broadcasts information about a Parallelism control preparation and data sequencing (S12). For example, the Layer Parallelism Controller 12 broadcasts information about a selected Parallelism scheme to the Broadcast Parallelism Controller 11 and the Data Sequencing Controller 13.

Next, the Parallelism Controller 10 sends the number of different Kernels to be broadcasted at the same time (#diffKbc) to the Sparse Weight Broadcaster 30 and sends data addresses to the PE Grid 20 (S13). Next, the Broadcaster 35 reads Weight values and Indexes through the Weight Controller 32 and the Index Controller 34 (S14). Next, the Main Controller 36 sets the Weight values and the Indexes in the bcus #1 to #M (S15). It is assumed that the PE Grid 20 has already received Input matrix data at an arbitrary timing between steps S11 and S15.

Next, the bcus #1 to #M broadcast the Weight values and the Indexes to the PEs #1 to #M (S16). Next, the PEs #1 to #M perform a convolution by using Data extracted from the Input matrix data and the Weight values broadcasted from the bcus #1 to #M based on the data addresses.

As explained above, the Sparse Weight Broadcaster 30 according to the second embodiment can broadcast Weight values to respective PEs based on the selected Parallelism scheme so that the utilization percentage of the PEs is increased. As a result, the PE Grid 20 can efficiently perform a convolution by using the Weight values broadcasted from the Sparse Weight Broadcaster 30 and using respective PEs.

Third Embodiment

Next, Mix Parallelism in which the Inter-output parallelism scheme and Intra-output parallelism scheme are combined with each other is explained. In the second embodiment, for the Intra-output parallelism scheme, an example in which #diffKbc is one (#diffKbc=1) is mainly explained. Further, for the Inter-output parallelism scheme, an example in which PEs use Kernels different from each other is mainly explained. In the third embodiment, for the Mix Parallelism scheme, an example in which #diffKbc is 2~M−1 is mainly explained. The Layer Parallelism Controller 12 determines which of the Inter-output parallelism scheme, the Intra-output parallelism scheme, and Mix Parallelism scheme should be performed based on the Layer information. The Inter-output parallelism scheme, the Intra-output parallelism scheme or Mix Parallelism scheme may be determined in advance.

In the Mix Parallelism, an example in which a plurality of PEs use the same Kernel in the Inter-output parallelism scheme is explained. Specifically, in the case where the PE Grid 20 includes PEs #1 to #M, the PEs #1 to #I (I is an integer no less than one and less than M) perform a convolution by using the same Kernel. Further, the PEs #I+1 to #M perform a convolution by using the same Kernel. The Kernel used by the PEs #I+1 to #M differs from the Kernel used by the PEs #1 to #I. In other words, the PEs #1 to #I receive the same Weight value and the same Index from the bcus #1 to #I. Further, the PEs #I+1 to #M receive the same Weight value and the same Index from the bcus #I+1 to #M. The Weight value and the Index that the PEs #1 to #I receive differ from those that the PEs #I+1 to #M receive.

Further, the PEs #1 to #I perform the Intra-output parallelism scheme. The PEs #I+1 to #M perform the Intra-output parallelism scheme, too. Specifically, the PEs #1 to #I perform the Intra-output parallelism scheme by using Kernel #1 and the PEs #I+1 to #M perform the Intra-output parallelism scheme by using Kernel #2. In other words, each of the group of PEs #1 to #I and the group of PEs #I+1 to #M performs a computation on the condition that #diffKbc is one (#diffKbc=1).

By using the Mix Parallelism as described above, it is recognized that each of the group of PEs #1 to #I and the group of PEs #I+1 to #M performs the Intra-output parallelism scheme and the Inter-output parallelism scheme is performed between the group of PEs #1 to #I and the group of PEs #I+1 to #M. In other words, it is recognized that each of the group of PEs #1 to #I and the group of PEs #I+1 to #M performs a computation on the condition that #diffKbc is one (#diffKbc=1). Further, it is recognized that, as a whole, computations are performed by the PEs #1 to #M on the condition that #diffKbc is two (#diffKbc=2). As a result, even in the Inter-output parallelism scheme, it is possible to use a larger number of PEs than the number of Kernels. Therefore, compared to the second embodiment, the utilization percentage of the PEs can be increased even further.

Fourth Embodiment

Figure 8:
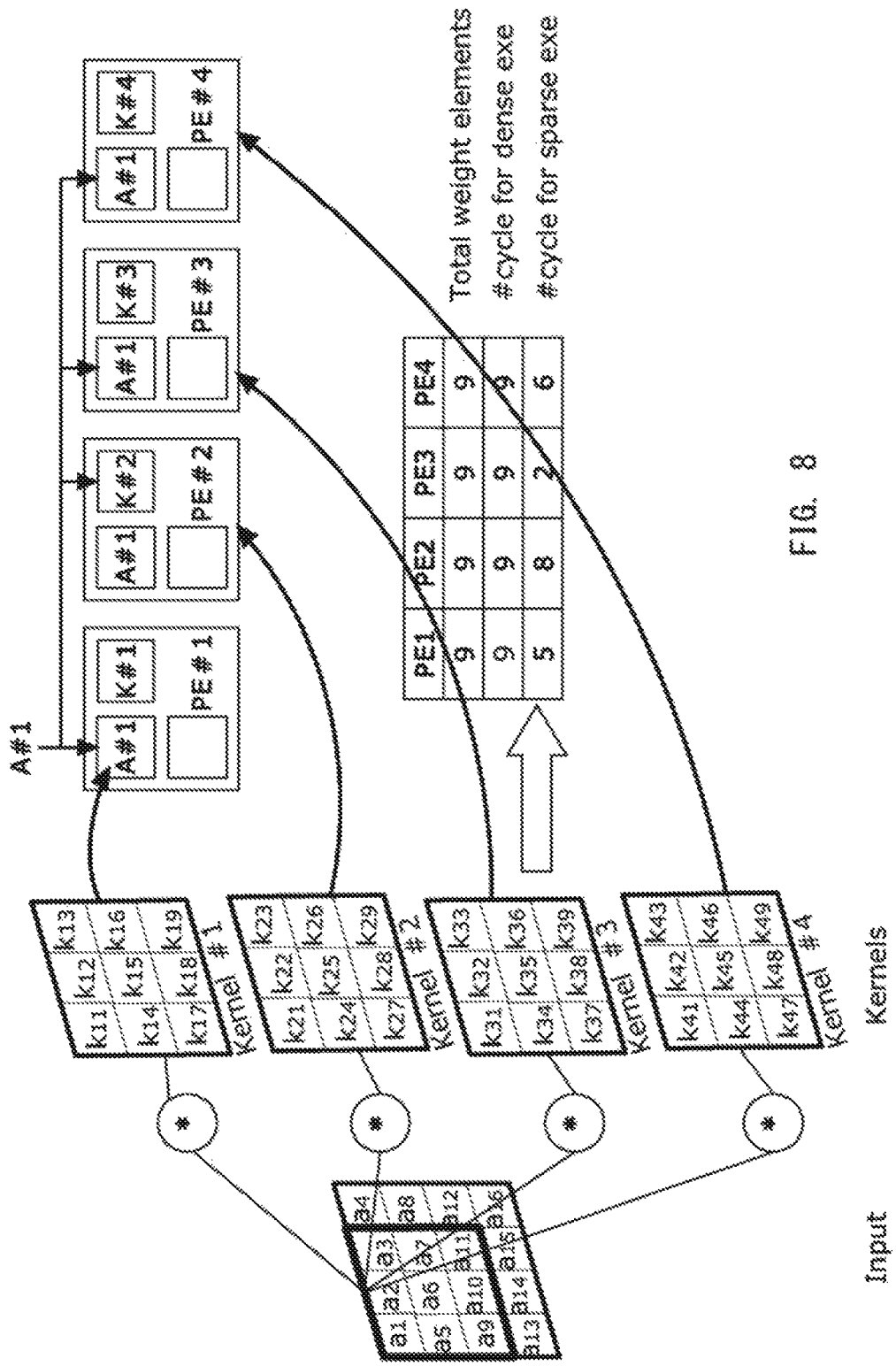
FIG. 8 is a diagram for showing an operation for solving an Unbalance workload according to a fourth embodiment.
Figure 9:
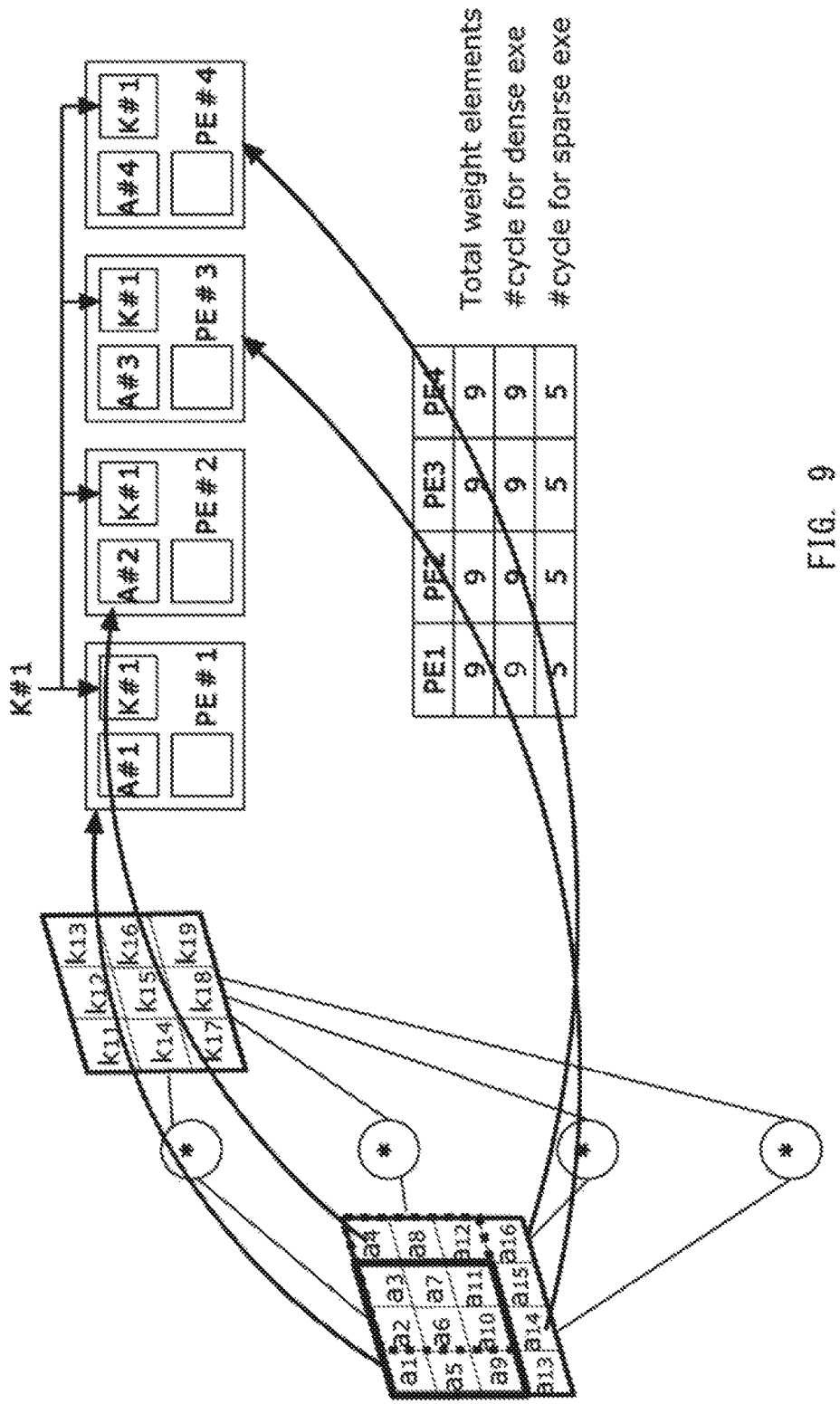
FIG. 9 is a diagram for showing an operation for solving an Unbalance workload according to the fourth embodiment.

Next, an operation for solving an occurrence of Unbalance workloads is explained with reference to FIGS. 8 and 9. FIG. 8 shows that when a convolution of 4×4 Input matrix data is performed by using 3×3 Kernels #1 to #4, computations are parallelly performed by using the PEs #1 to #4. Further, FIG. 8 shows that an Inter-output parallelism scheme in which the PEs #1 to #4 use Kernels different from each other (i.e., use Kernels #1 to #4) is performed. In this case, the number of zero values included in each Kernel differs from one another. When the PE performs computations, it can skip a computation for a zero value. When a computation using one Weight included in a Kernel is defined as one cycle, the PE #1 performs computations of five cycles and the PE #2 performs computations of eight cycles. Further, the PE #3 performs computations of two cycles and the PE #4 performs computations of six cycles. When the Inter-output parallelism scheme is performed, Unbalance workloads are caused among the PEs. As a result, for example, when the PE #3 finishes a computation using given Data, it has to wait until the other PEs finish their computations before starting a computation using the next Data.

Further, assuming that the Stride of the Input matrix data shown in FIG. 8 is one, 2×2 Output matrix data can be generated. That is, since the number of pixels of the Output matrix data becomes four, computations can be parallelly performed by using the PEs #1 to #4 even when the Intra-output parallelism scheme is performed.

Next, workloads that occur when the Intra-output parallelism scheme is performed are explained with reference to FIG. 9. When the Intra-output parallelism scheme is performed, the PEs #1 to #4 perform computations by using the same Kernel #1. Therefore, every PE performs computations of the same number of cycles. Therefore, workloads in the PEs become equal to each other. As a result, the PEs #1 to #4 can start computations using the next Kernel at the same timing.

As described above, when the utilization percentage of the PEs is unchanged between the Inter-output parallelism scheme and the Intra-output parallelism scheme, the Layer Parallelism Controller 12 may select the. Intra-output parallelism scheme in consideration of workloads among the PEs. As a result, it is possible to solve Unbalance workloads that would otherwise be caused among the PEs.

Figure 10:
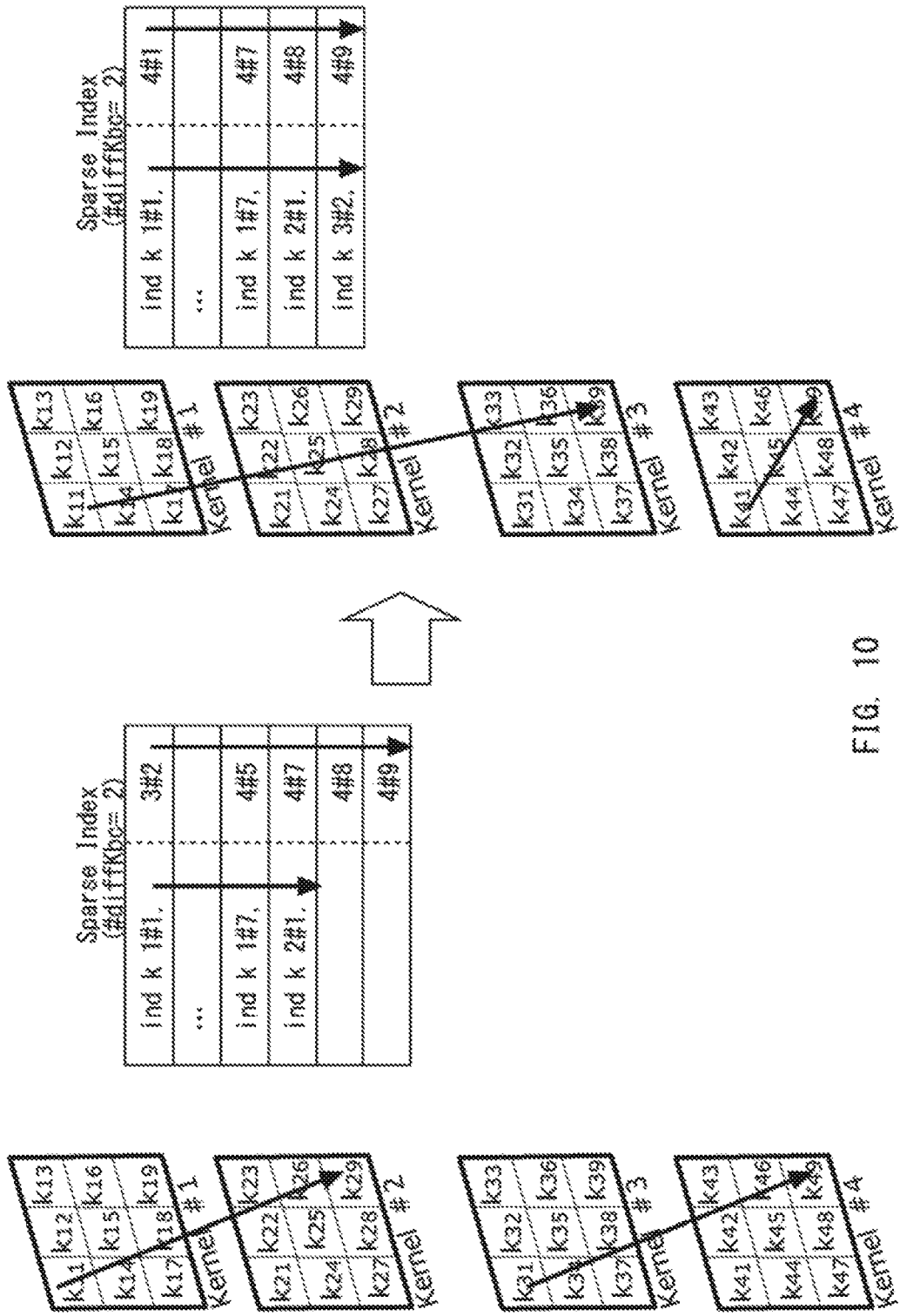
FIG. 10 is a diagram for showing an operation for solving an Unbalance workload according to the fourth embodiment.

Another example for solving Unbalance workloads is explained hereinafter with reference to FIG. 10. FIG. 10 shows an operation according to the Inter-output parallelism scheme on the condition that #diffKbc is two (#diffKbc=2). A left part of FIG. 10 shows that the PE #1 performs computations in the order of Kernels #1 and #2, and the PE #2 performs computations in the order of Kernels #3 and #4. In this case, the PE #1 performs computations of six cycles in total and the PE #2 performs computations of eight cycles in total. As a result, an Unbalance workload is caused between the PEs #1 and #2.

Therefore, to solve the Unbalance workload, the PE #1 may perform computations in the order of Kernels #1, #2 and #3, and the PE #2 may perform a computation of Kernel #4 as shown in FIG. 10. By doing so, each of the PEs #1 and #2 performs computations of seven cycles and hence the Unbalance workload can be solved. As described above, the Sparse Weight Broadcaster 30 may control the number of Weight values of the Kernels that are output to respective PEs so that their workloads become equal to each other, or get closer to each other.

Next, a configuration example of the information processing apparatus 1 or 2 explained in the above-described plurality of embodiments is explained hereinafter with reference to FIG. 14.

Figure 14:
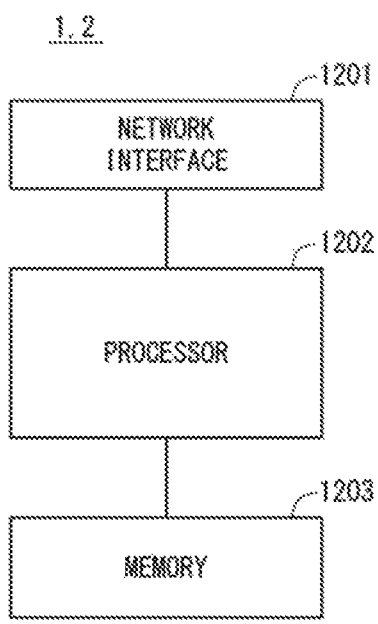
FIG. 14 is a configuration diagram of an information processing apparatus according to a respective embodiment.

FIG. 14 is a block diagram showing a configuration example of the information processing apparatus 1 or 2. As shown in FIG. 14, the information processing apparatus 1 or 2 includes a network interface 1201, a processor 1202, and a memory 1203. The network interface 1201 is used for communication with other network node apparatuses forming a communication system. The network interface 1201 may include, for example, a network interface card (NIC) in conformity with IEEE 802.3 series.

The processor 1202 performs processes performed by the information processing apparatus 1 or 2 explained with reference to the sequence diagrams and the flowcharts in the above-described embodiments by loading software (a computer program) from the memory 1203 and executing the loaded software. The processor 1202 may be, for example, a microprocessor, an MPU (Micro Processing Unit), or a CPU (Central Processing Unit). The processor 1202 may include a plurality of processors.

The memory 1203 is formed by a combination of a volatile memory and a nonvolatile memory. The memory 1203 may include a storage disposed apart from the processor 1202. In this case, the processor 1202 may access the memory 1203 through an I/O interface (not shown).

In the example shown in FIG. 14, the memory 1203 is used to store a group of software modules. The processor 1202 can perform processes performed by the information processing apparatus 1 or 2 explained in the above-described embodiments by reading the group of software modules from the memory 1203 and executing the read software modules.

As explained above with reference to FIG. 14, each of the processors included in the information processing apparatus 1 or 2 in the above-described embodiments executes one or a plurality of programs including a group of instructions to cause a computer to perform an algorithm explained above with reference to the drawings.

In the above-described examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Note that the present disclosure is not limited to the above-described embodiments and can be modified as appropriate without departing from the spirit and scope of the present disclosure.

REFERENCE SIGNS LIST

1 Information Processing Apparatus
2 Information Processing Apparatus
10 Parallelism Controller
11 Broadcast Parallelism Controller
12 Layer Parallelism Controller
13 Data Sequencing Controller
20 PE Grid
30 Sparse Weight Broadcaster
31 Weight memory
32 Weight Controller
33 Index memory
34 Index Controller
35 Broadcaster
36 Main Controller

What is claimed is:

1. An information processing apparatus comprising:
a PE (Processing Element) Grid configured to perform a convolution by using a plurality of Kernels for Input matrix data and thereby generate a different Output matrix data for each of the used Kernels, the PE Grid including a plurality of PEs configured to calculate pixels constituting the Output matrix data; and
a Parallelism Controller configured to determine, based on a dimension of the Input matrix data or a dimension of the Output matrix data, and the number of the Kernels, whether pixels included in respective Output matrix data should be parallelly calculated or a plurality of pixels included in one Output matrix data should be parallelly calculated.

2. The information processing apparatus according to claim 1, wherein the Parallelism Controller determines whether the pixels included in respective Output matrix data should be parallelly calculated or the plurality of pixels included in one Output matrix data should be parallelly calculated so that the number of PEs that perform computations, among the plurality of PEs, increases.

3. The information processing apparatus according to claim 1, further comprising a Sparse Weight Broadcaster configured to determine Kernels applied to the plurality of PEs, wherein
the Parallelism Controller determines the number of Kernels to be used at the same time in the PE Grid and outputs information about the determined number of Kernels to the Sparse Weight Broadcaster, and
the Sparse Weight Broadcaster assigns Kernels to the plurality of PEs so that the determined number of Kernels parallelly perform computations.

4. The information processing apparatus according to claim 3, wherein the Sparse Weight Broadcaster outputs index information including Kernel IDs for identifying the Kernels and element IDs for identifying a plurality of elements included in the Kernels, and Weight values associated with the Kernel IDs and the element IDs, to the plurality of PEs.

5. The information processing apparatus according to claim 4, wherein
the Parallelism Controller outputs address information for identifying data to be extracted from the Input matrix data to the plurality of PEs, and
the plurality of PEs extract data corresponding to the address information from the Input matrix data.

6. The information processing apparatus according to claim 5, wherein
each of PEs to which the same Kernel is assigned extracts different data from the Input matrix data, and
each of PEs to which different Kernels are assigned extracts the same data from the Input matrix data.

7. The information processing apparatus according to claim 3, wherein the Sparse Weight Broadcaster assigns the same Kernel to all the PEs included in the PE Grid, assigns different Kernels to all the PEs included in the PE Grid, or divides the plurality of PEs included in the GE Grid into two or more groups and assigns a different Kernel to each of the groups.

8. The information processing apparatus according to claim 3, wherein
the PEs calculate values of pixels by using Non-zero values included in the Kernels, and
the Sparse Weight Broadcaster assigns the Kernels to respective PEs so that a difference between the numbers of Non-zero values that are used when the respective PEs calculate pixels becomes smaller than a predetermined threshold.

9. An information processing method comprising:
performing a convolution by using a plurality of Kernels for Input matrix data and thereby acquiring a dimension of Output matrix data generated for each of the used Kernels or a dimension of the Input matrix data, and the number of the Kernels;
determining, based on the dimension of the Output matrix data or the dimension of the Input matrix data, and the number of the Kernels, whether pixels included in respective Output matrix data should be parallelly calculated or the plurality of pixels included in one Output matrix data should be parallelly calculated; and
generating the Output matrix data based on the calculation method.

10. A non-transitory computer readable medium storing a program for causing a computer to execute:
performing a convolution by using a plurality of Kernels for Input matrix data and thereby acquire a dimension of Output matrix data generated for each of the used Kernels or a dimension of the Input matrix data, and the number of the Kernels;
determining, based on the dimension of the Output matrix data or the dimension of the Input matrix data, and the number of the Kernels, whether pixels included in respective Output matrix data should be parallelly calculated or the plurality of pixels included in one Output matrix data should be parallelly calculated; and generating the Output matrix data based on the calculation method.

* * * * *